J. G. McALPINE.
VEHICLE WHEEL.
APPLICATION FILED JULY 27, 1909.
993,088.
Patented May 23, 1911.
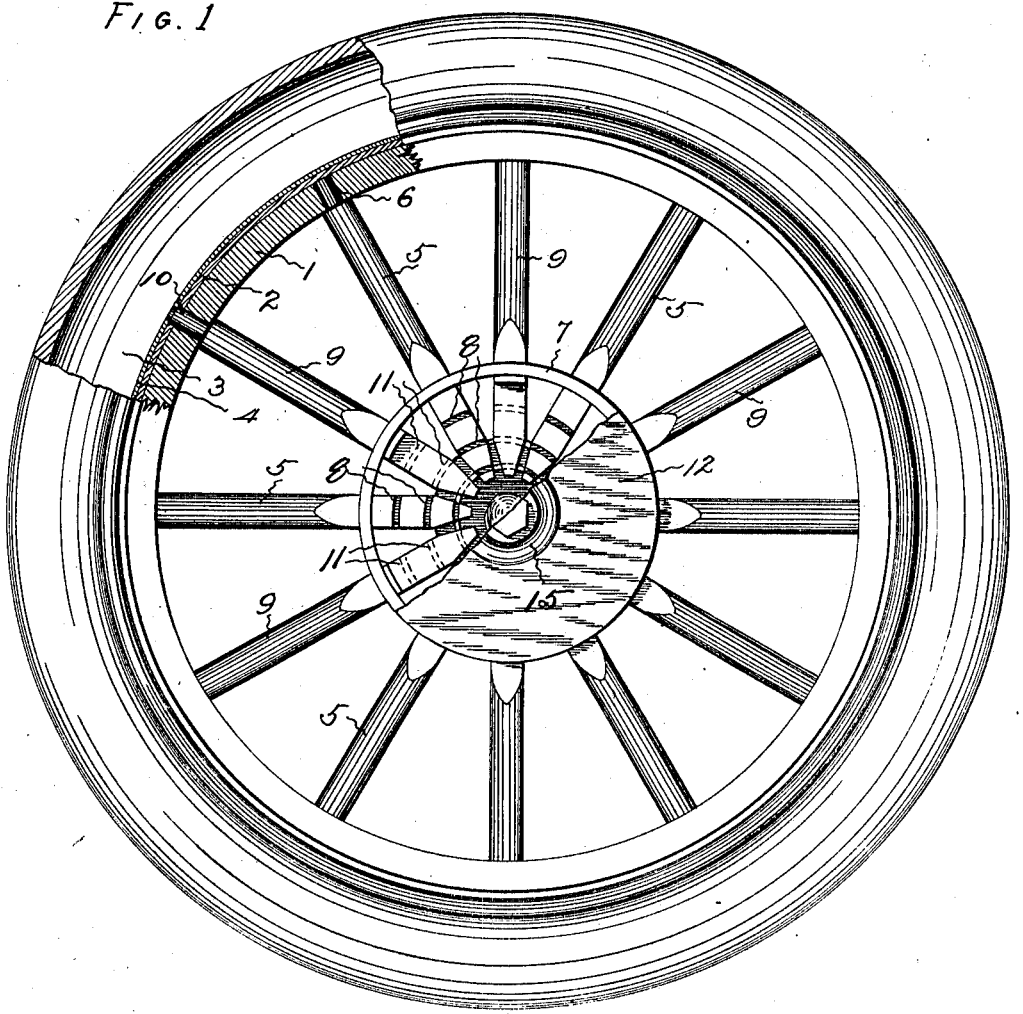
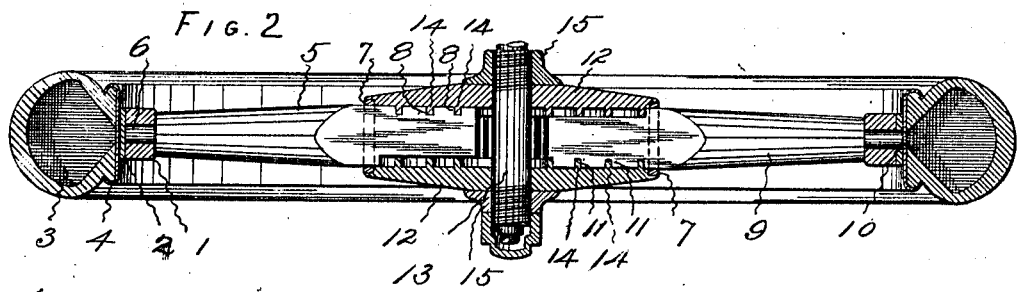
WITNESSES:
INVENTOR:

UNITED STATES PATENT OFFICE.

JAMES GARROW McALPINE, OF GILROY, CALIFORNIA.

VEHICLE-WHEEL.

993,088.   Specification of Letters Patent.   Patented May 23, 1911.

Application filed July 27, 1909. Serial No. 509,879.

*To all whom it may concern:*

Be it known that I, JAMES G. MCALPINE, a citizen of the United States, residing at Gilroy, in the county of Santa Clara and State of California, have invented a new and useful Improvement in Vehicle-Wheels, of which the following is a specification.

This invention relates to the construction of a demountable rim wheel.

The object of the invention is to construct a wheel which is simple to build and easy to keep tight, with means for firmly securing a demountable tire holding rim, which are readily expanded for fastening a tire rim and easily contracted for releasing a tire rim.

With a wheel which embodies this invention a tire that is in proper condition for use can be quickly substituted by anyone, with a minimum expenditure of effort, for a tire that has become damaged, or for one in a condition unsuitable for use.

Figure 1 of the accompanying drawings shows a side view of a wheel which embodies this invention, with portions of the hub, felly, rim and tire cut in section, in order to illustrate the construction. Fig 2 shows a diametrical section of the wheel.

The felly 1 may have any desired shape. Outside of the felly, which preferably is made of wood, may be a metal band 2. The tire 3 which is shown, has the form of the outer casing of the common pneumatic tire, the inner tube being omitted. This tire is fastened in a tire rim 4 which is demountably fitted onto the felly band. The spokes 5 at their outer ends have tenons 6 which project into sockets in the felly. The inner ends of the spokes extend through a hub ring 7, and in their sides have grooves 8. It is desirable to alternate these felly holding spokes with rim holding spokes 9, as shown in Figs. 1 and 2. These rim spokes have tenons 10 that extend through the felly and project into openings in the rim which holds the tire. These rim holding spokes also extend through the hub ring and in their sides near the inner ends have grooves 11. The grooves in the inner ends of the felly spokes and the grooves in the inner ends of the rim spokes, may as shown be on opposite sides. The hub may be formed of plates 12, which turn upon the sleeve or axle box 13. These plates have on their inner faces helical threads 14, which project into the grooves in the sides of the inner ends of the spokes. When the nuts 15 that turn on the axle box are loosened, the hub plates may be rotated.

In the form of wheel described, when the inner plate is rotated in one direction, the felly spokes are drawn inwardly by the helical thread so as to relieve all outward strain on the felly. When that plate is turned in the opposite direction, the helical thread forces the felly spokes outwardly and tightens the felly and the band about it. When the outer plate is turned in one direction, the spokes which hold the rim are drawn inwardly by the helical thread so as to release the rim and allow the rim and tire to be removed. When that plate is turned in the opposite direction, the rim holding spokes are forced outwardly into the openings so as to securely fasten the rim and tire in place upon the felly. After the parts have been suitably adjusted, by turning the plates, the nuts are tightened so as to prevent the plates from turning and loosening the parts. With the construction shown, the hub plates will not be turned by any inward pressure of the spokes, but by turning the hub plates all the spokes can be easily, quickly and powerfully drawn inwardly for loosening the felly and releasing the rim, or forced outwardly for tightening the felly and fastening the rim.

With this invention a rim with a tire can be easily and quickly attached to or detached from the felly of a wheel, so that in case of accident to a tire, a new one ready for use, may be substituted, without delay or without the exercise of much labor.

This invention provides an automobilist with a rim and an inflated tire which can be quickly substituted in case of accident to a tire on the wheel.

The invention claimed is:

A wheel having a hub, a felly, a rim removably mounted on the felly, felly-holding spokes with their outer ends engaging and extending into the felly and with their inner ends extending into the hub and provided on one side with helical grooves, rim-holding spokes with their outer ends extending through the felly and into the rim and with their inner ends extending into the hub and provided with helical grooves on the side opposite from the grooves in the felly-holding spokes, a plate rotatable on the hub and against the inner ends of the spokes on each side, one of said plates having helical threads fitting the corresponding helical grooves in the felly-holding spokes and the other of said plates having helical threads fitting the corresponding helical grooves in the rim-holding spokes, and means for clamping the plates in position on the hub and against the inner ends of the spokes.

JAMES GARROW McALPINE.

Witnesses:
W. A. WHITEHURST,
O. W. CHESBRO.